United States Patent [19]

Mercer

[11] 4,133,347
[45] Jan. 9, 1979

[54] WASTE EVACUATION ATTACHMENT FOR RECREATIONAL VEHICLES

[76] Inventor: Albert Mercer, P.O. Box 446, Franklin, Mass. 02038

[21] Appl. No.: 847,122

[22] Filed: Oct. 31, 1977

[51] Int. Cl.² .................... F16K 27/12; F16L 3/00
[52] U.S. Cl. .................... 137/344; 137/355.16; 285/62; 285/299; 285/402; 285/423; 285/DIG. 2
[58] Field of Search .................... 137/344, 355.16; 285/62, 121, 299, 401, 402, 423, 376, 302, 300, 301, DIG. 2; 138/106; 141/383–386, , 382, 388, 379; 222/538, 530, 567, 543

[56] References Cited

U.S. PATENT DOCUMENTS

| 2,915,081 | 12/1959 | Warren | 285/298 X |
| 3,496,959 | 2/1970 | Wolfe et al. | 137/344 |
| 3,712,331 | 1/1973 | Otto | 137/355.16 |
| 3,730,228 | 5/1973 | Gibbs | 285/302 X |
| 3,811,462 | 5/1974 | Feliz | 137/344 |

FOREIGN PATENT DOCUMENTS 2154814  4/1973  France .................... 285/299

Primary Examiner—Dave W. Arola
Attorney, Agent, or Firm—Ralph S. Branscomb

[57] ABSTRACT

A waste evacuation attachment for a recreational vehicle comprises a rigid cylindrical housing readily mountable to the existing fittings of a sewage discharge outlet of the recreational vehicle, there being a telescoping hose contained within the housing and having a fitting on the extendable end to adapt the hose to waste receiving receptacles, the assembly eliminating the difficulties inherent in conventional recreational vehicles which require the attachment and removal of a separate hose unit whenever the vehicle hooks up at an overnight site.

6 Claims, 7 Drawing Figures

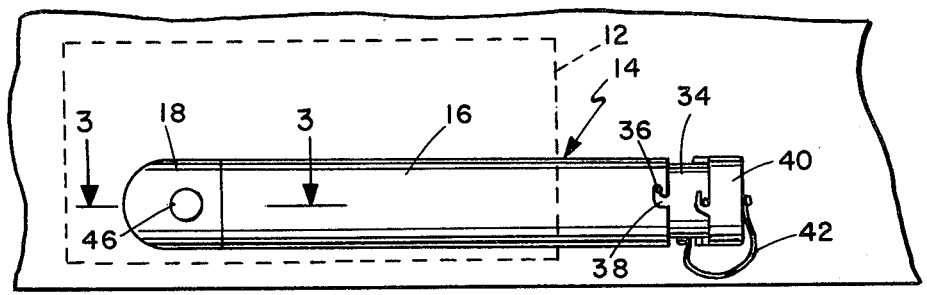
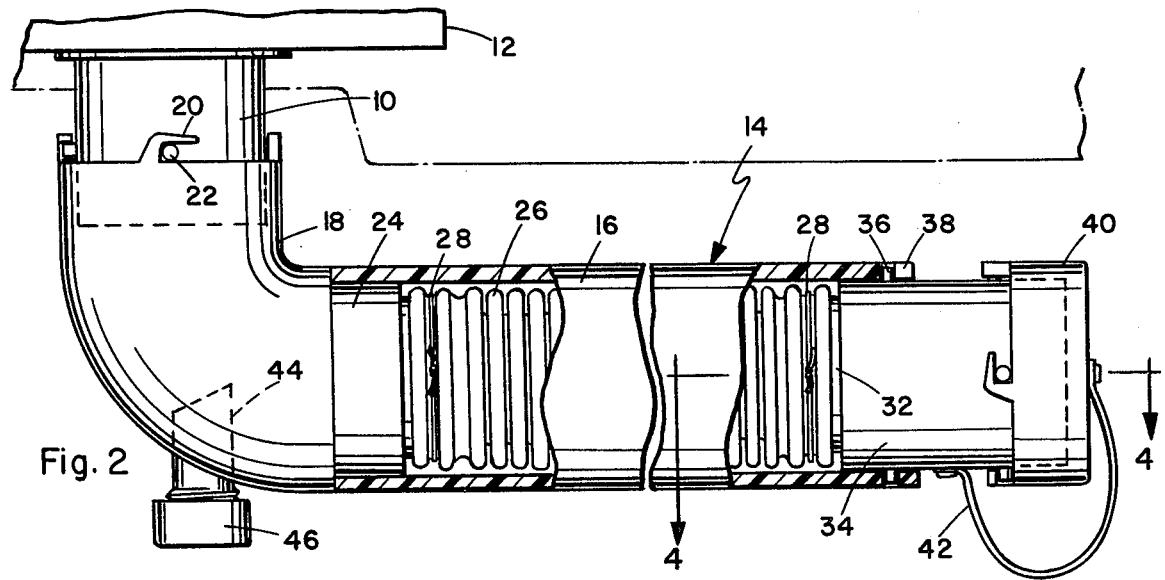
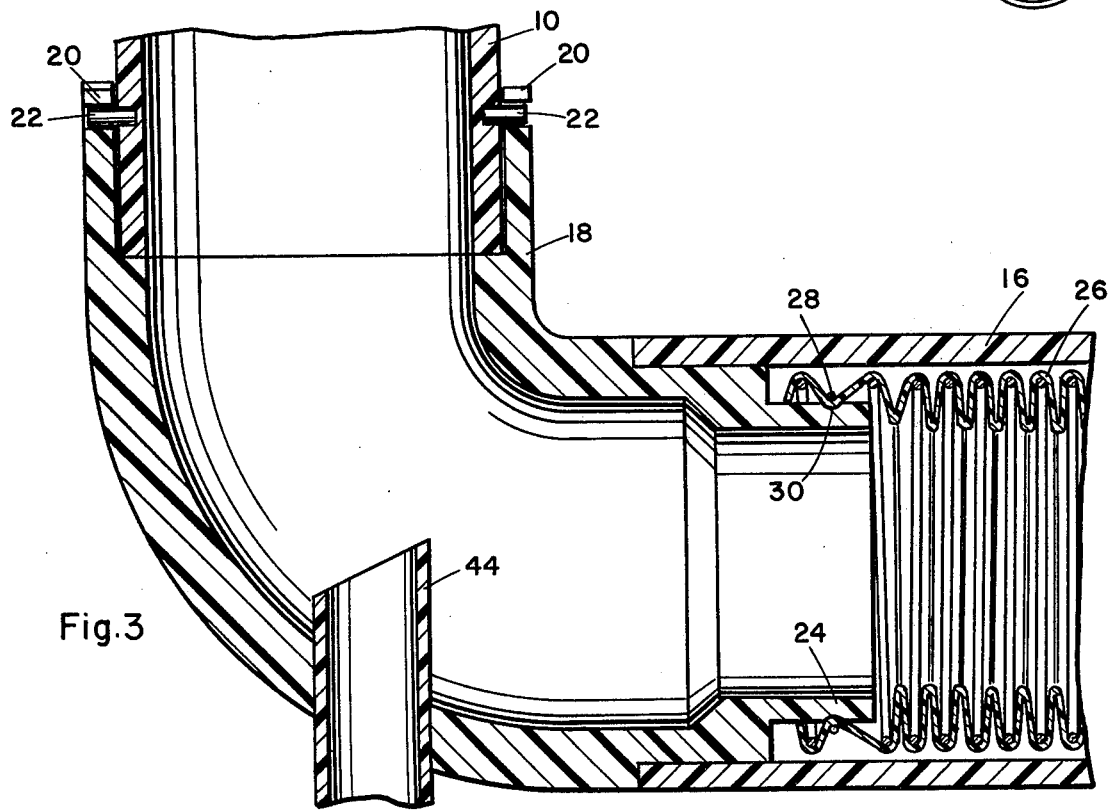

WASTE EVACUATION ATTACHMENT FOR RECREATIONAL VEHICLES

BACKGROUND OF THE INVENTION

Conventional recreational vehicles having self-contained bathrooms and sewage processing systems uniformly utilize the same means of conducting waste to storage tanks or processing systems which are used in RV parks and the like. These vehicles have an externally accessible cabinet which houses a length of hose which is manually connected to a hose fitting on an outlet stub pipe of the recreational vehicle, the other end being extended to the RV park receptacle fitting. This is at best somewhat clumsy, and it is necessary to handle the hose and flush out the waste when the vehicle is preparing to move on.

There is a need therefore for a simple, ad-on unit which is readily connectable to existing recreational vehicles to simplify this procedure by not requiring the attachment and cleaning of a separate hose assembly. Although units have been devised for simplifying this procedure as is evidence by U.S. Pat. Nos. 3,712,331 and 3,811,462, these units are by and large complicated and require special mounting procedures.

SUMMARY OF THE INVENTION

The present invention is a simple ad-on unit which connects directly to the outlet stub pipe of a recreational vehicle and requires no special mounting procedure whatsoever. The unit comprises a rigid outer cylindrical housing having one end adapted to connect to the existing stub pipe fitting of a recreational vehicle. Contained within the housing is an axially compressible and expandable accordian hose connected at one end to the end of the housing connected to the recreational vehicle, the other end being extendable outside the housing and being connected to an end sleeve having a removable cap thereon, the end sleeve having connections to mount same within the rigid cylindrical housing.

The unit can be installed on vehicles at the point of manufacture with no difficulty, but in the embodiment described they are ideally adapted to be retrofitted on existing recreational vehicles, taking advantage of the mounting fittings which are currently used to attach existing hoses to the stub pipe to convey the sewage to the fitting at the park site.

BRIEF DESCRIPTION OF THE DRAWINGS

FIG. 1 is a side elevation view of the unit attached to a holding tank;

FIG. 2 is an enlarged top plan view of the unit with portions cut away;

FIG. 3 is an enlarged sectional view taken on line 3—3 of FIG. 1;

DETAILED DESCRIPTION OF THE PREFERRED EMBODIMENT

Figure 4:
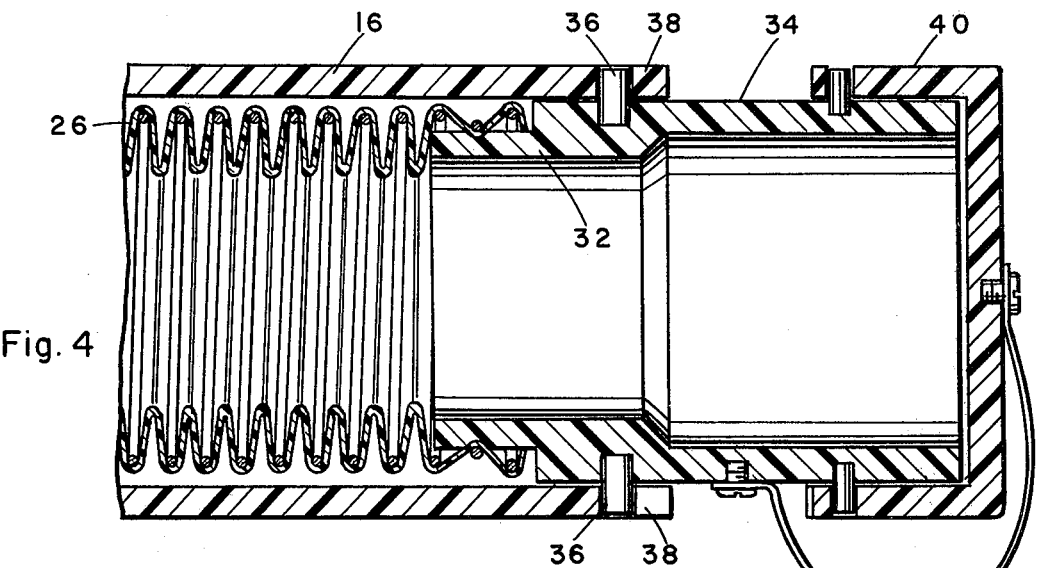
FIG. 4 is an enlarged sectional view taken on line 4—4 of FIG. 2.

The unit is shown in its principal embodiment in FIG. 2 wherein it is attached to a stub pipe sewage outlet 10 of a recreational vehicle, a part of which is shown at 12. The assembly is indicated at 14 and comprises a central cylinder 16 and a mounting end piece 18 by which the unit is attached to the recreational vehicle.

This attachment is accomplished by means of hooking members 20 which take advantage of existing pegs 22 currently utilized to attach the sewage hose to the recreational vehicle outlet. As is easily visualized these hooks and pegs, which come in sets of four, are connected by inserting the end piece 18 over the stub pipe and twisting a few degrees to the right. The hooks are so arranged that when the connection is made as in FIG. 2, the housing is horizontally extended as shown in FIG. 1.

In side these cylindrical portions 16 of the unit is a collar 24 which is integral with the end piece. This collar could be molded integrally with the end piece, or provided as a separate cylinder and glued or welded in place. An accordian hose 26 is slipped over the collar 24 and attached thereto by a wire 28 which is simply twisted to engage the hose on the end piece. The collar has an annular groove 30 which facilitates the positive engagement thereon of the accordian hose.

Although other means obviously could be used to attach the hose, it is important that inasmuch as the hose is the weakest link in the assembly and represents the part most likely to break or deteriorate over a period of time, it should be easily removable and replaceable so that the entire unit need not be replaced when the hose breaks down.

The other end of the accordian hose is connected in the same manner as the first end to a collar 32 on a cylindrical end piece or sleeve 34. This sleeve is provided with pegs 36 by which the sleeve is connected to hooks 38 on the outer end of cylindrical portion of the assembly.

At the end of the sleeve 34 is an end cap 40 connected to the sleeve by a line or chain 42 and mounted to the sleeve with the same hook-and-peg means used for other purposes.

It is advantageous from a point of view of utility that the end sleeve 34 can be dislodged from the cylindrical housing while the cap is still in place. In use, the accordian hose can be extended all the way to the necessary receptacle fitting while the cap is on, and then the cap is removed at the last instant so the chance of sewage spilling from the end of the hose is minimized.

A nozzle 44 is injected into the assembly and glued to the connecting end piece 18. This nozzle has a hose fitting 46 and is utilized for flushing the hose and the pipes within the recreational vehicle prior to storing the hose. This nozzle allows the entire waste elimination system to be flushed from outside, instead of through the toilet which is currently necessary.

As mentioned, the unit is ideal for attachment to an existing stub pipe. A great many recreational vehicles have a stub pipe that exits the side of the vehicle and can best utilize an evacuation assembly of the type shown in FIG. 2 which is mounted as is shown in FIGS. 1 and 2 to extend alongside the vehicle, occupying as little room as is possible.

Figure 6:
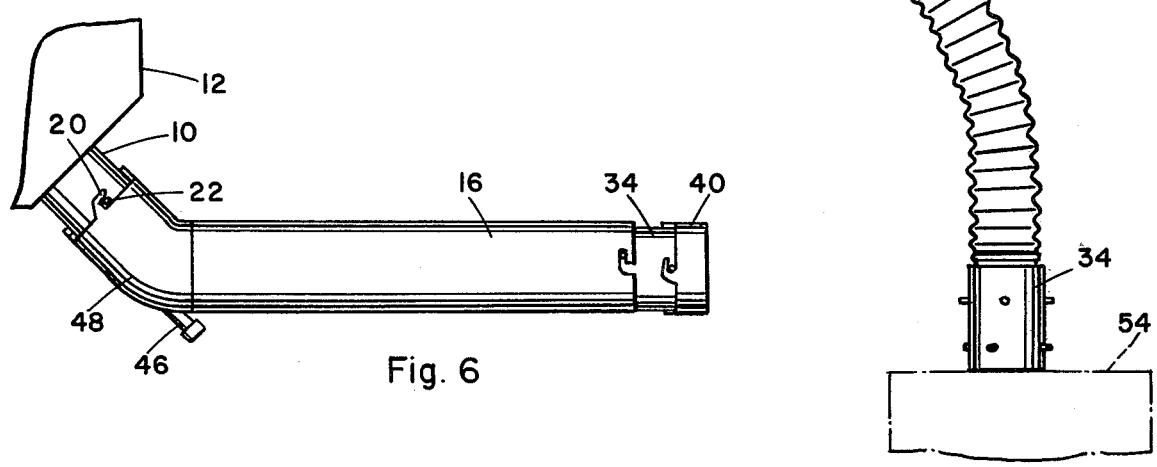
FIG. 6 illustrates an alternative connection to a holding tank.
Figure 7:
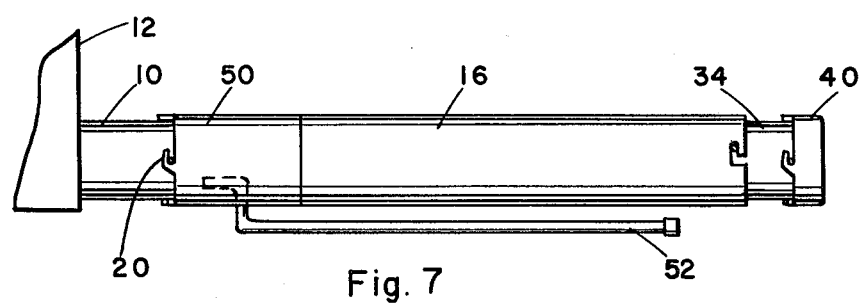
FIG. 7 illustrates a further type of connection to a holding tank.

However, some vehicles have stub pipes that extend at slightly different angles and are positioned somewhat differently, and for these other types of vehicles modifications of the unit may be easily made by replacing the end piece 18, which has a right angle bend, by a diagonal fitting such as the member 48 in FIG. 6, or a straight fitting shown in FIG. 7. An extended nozzle connector pipe 52 is shown in FIG. 7 which is necessitated by the modified design. The stub pipe in the illustration of FIG. 7 would ordinarily be underneath the vehicle, and the evacuation assembly would extend from this pipe to the perimeter of the vehicle where the accordian hose is easily accessible.

Figure 5:
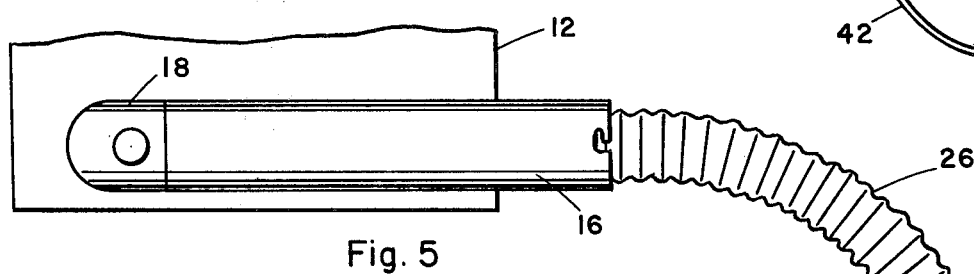
FIG. 5 is a view similar to FIG. 1, but with the hose extended.

FIG. 5 illustrates the unit in use wherein the accordian hose is extended to a recreational vehicle park waste receptacle fitting 54.

The unit as described and claimed herein is economical to manufacture, utilizing off-the-shelf structures for the most part so that no molds are required in the manufacture. It is also a great advantage of the unit that it is so easily retrofitted on any recreational vehicle, as well as being very easily adapted to installation at the point of manufacture or permanent installation by the user on a previously manufactured unit simply by applying glue to the contacting areas, to reinforce the hook and peg connectors. The unit greatly simplifies the previously tedious procedure of having to connect, flush, and disconnect the separate hose length currently being used in recreational vehicles, and yet is not rendered impractical by expense, complexity, or inability to easily retrofit the unit onto RV's of conventional manufacture without requiring structural modification of the vehicle.

I claim:

1. A waste evacuation attachment for a recreational vehicle having a stub pipe waste outlet, said attachment comprising:
   (a) a rigid cylindrical housing having means to connect one end thereof rigidly to said stub pipe in communication therewith, whereby said housing when so connected defines an integral, immobile extension of said stub pipe;
   (b) an axially expandable hose mounted in said housing and having a fixed end connected to said one end of said housing and having a free end extendable externally of said housing;
   (c) Said hose being of length when expanded which is large compared to the length of said housing to permit the free end of said hose to reach a stationary sewage receiving tank, and the compressed length of said hose being such that said hose is completely contained in said housing when compressed;
   (d) an end piece element mounted on the free end of said hose and being adapted to connect to the inlet of a stationary sewage receiving tank to define a continuous waste flow passageway from said waste containment facility through said housing and hose into said stationary sewage receiving tank;
   (e) a cap element and means to mount same in sealed relation to said end piece element when said attachment is not in use; and
   (f) said and piece element having means to engage same to said housing when the attachment is not in use to define a compact, self-contained sealed unit completely containing said hose.

2. Structure according to claim 1 and including an injection nozzle with a hose attachment fitting mounted in said housing near said one end thereof to permit the attachment and flushing of said attachment with a garden hose.

3. Structure according to claim 1 wherein said housing defines an internal collar of diameter less than said housing, and said hose is removably connected to said collar.

4. Structure according to claim 3 wherein said hose is mounted over said collar in said housing and connected to said collar by means of a twist wire.

5. Structure according to claim 4 wherein the other end of said hose is removably mounted by means of a twist wire to said end piece element.

6. In a recreational vehicle having a waste containment facility, a self-contained waste discharge system for delivering waste to a stationary sewage receiving tank comprising:
   (a) a rigid housing mounted on said vehicle and having one end thereof communicating with said discharge system and the other end being open;
   (b) an axially expandable hose having a fixed end mounted internally in said housing and having a free end extendable externally of said housing through the open end thereof;
   (c) said hose being of length when expanded which is large compared to the length of said housing to permit the free end of said hose to reach a stationary sewage receiving tank, and the compressed length of said hose being such that said hose is completely contained in said housing when compressed;
   (d) an end piece element mounted on the free end of said hose and being adapted to connect to the inlet of a stationary sewage receiving tank to define a continuous waste flow passageway from said waste containment facility through said housing and hose into said stationary sewage receiving tank;
   (e) a cap element and means to mount same in sealed relation to said end piece element when said waste discharge system is not in use; and
   (f) said and piece element having means to mount same to the free end of said housing to completely contain said hose and define a self-contained, sealed unit.

* * * * *